United States Patent Office 3,524,818
Patented Aug. 18, 1970

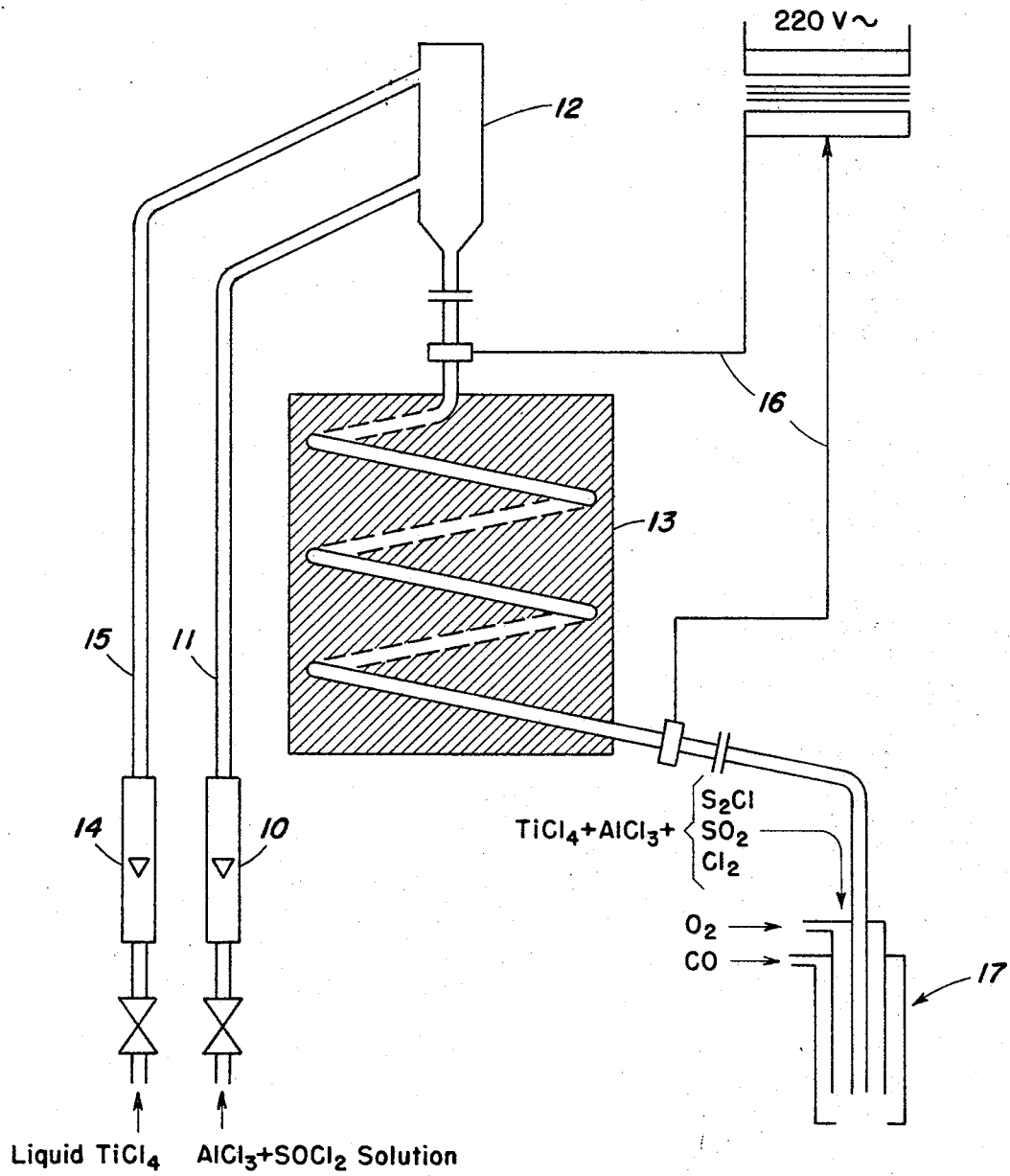

3,524,818
PROCESS FOR PRODUCTION OF VAPOROUS TITANIUM TETRACHLORIDE CONTAINING EXACT AMOUNTS OF ALUMINUM TRICHLORIDE
Karl-Jurgen Bramekamp and Gerhard Hitzemann, Leverkusen, Germany, assignors to Titangesellschaft m.b.H., Leverkusen, Germany, a corporation of Germany
Filed June 16, 1967, Ser. No. 646,594
Claims priority, application Germany, July 26, 1966, T 31,684
Int. Cl. C09k 3/00
U.S. Cl. 252—188.3                                6 Claims

ABSTRACT OF THE DISCLOSURE

The present invention relates to an improved process for producing an admixture of vaporous titanium tetrachloride and aluminum trichloride in exact predetermined ratios.

BACKGROUND OF INVENTION

The invention is especially useful in the manufacture of titanium dioxide by the vapor phase reaction of titanium dioxide by the vapor phase reaction of titanium tetrachloride with oxygen in the presence of small amounts of aluminum or aluminum compounds to produce titanium dioxide of the rutile modification, the aluminum or aluminum compound forming aluminum oxide which, under the conditions of the reaction, effects conversion of the titanium dioxide to the rutile modification.

The amount of aluminum or aluminum compound necessary to effect complete conversion of the titanium dioxide to the rutile modification depends upon the conditions of the reaction and in general the amount added to the titanium tetrachloride is such that the titanium dioxide produced therefrom contains from 1 to 5% by weight of aluminum oxide. Moreover in order to obtain a vapor phase rutile titanium dioxide of uniform quality it is necessary to maintain uniformly constant reaction conditions i.e. pressure, temperature, gas velocities, etc. as well as a constant ratio of aluminum trichloride and titanium tetrachloride. The present invention relates especially to the problem of maintaining a constant ratio of aluminum trichloride to titanium tetrachloride at the level required for any given reaction conditions.

Earlier efforts to solve the problem may be found in the following prior art patents:

German Pat. 977,339—wherein metallic aluminum powder is added to a mixture of vaporous $TiCl_4$ and oxygen; Britich Pat. 758,409—wherein molten aluminum is sprayed into a mixture of vaporous $TiCl_4$ and oxygen; German Pat. 977,339—wherein liquid titanium tetrachloride together with oxygen and an inert gas is passed through solid aluminum trichloride in an evaporator thereby vaporizing the titanium tetrachloride and aluminum trichloride; German published application 1,147,921—wherein a carrier gas stream of vaporous $TiCl_4$ and oxygen is passed through a fluidized bed of fine particle size inert material and aluminum trichloride; U.S. 2,559,638—wherein aluminum trichloride and titanium tetrachloride are evaporated separately and then combined in the desired ratio; U.S. 2,790,704—wherein vaporous $TiCl_4$ and chlorine are passed through a bed of aluminum metal particles; or through a bed of granulated aluminum oxide (U.C. 2,437,171); British Pat. 939,241—wherein a stream of chlorine gas diluted with an inert gas or $TiCl_4$ is passed through a fluidized bed of aluminum powder; and U.S. 2,824,050—wherein aluminum trichloride is dissolved in hot liquid $TiCl_4$ and the solution evaporated after removal of the non-volatile precipitates.

Despite the variety of methods taught by the prior art all have entailed the use of relatively expensive equipment and none guarantee an exact ratio of aluminum trichloride and titanium tetrachloride. This may be because the reaction of aluminum metal with chlorine is exothermic and hence produces heat which cannot be dissipated sufficiently to preclude sintering or melting of the metallic aluminum; or by reason that the temperature, pressure and feed rate of the components used cannot be kept under close enough control during evaporation to insure the desired ratio of aluminum trichloride and titanium tetrachloride. Also in the method of U.S. 2,824,050 the solubility of aluminum trichloride in liquid titanium tetrachloride is not only relatively low but depends largely upon maintaining the temperature of the liquid titanium tetrachloride at the proper level for a desired concentration of aluminum trichloride in the aluminum trichloride solution. As a consequence the concentration of aluminum trichloride in the aluminum trichloride-titanium tetrachloride solution has been found to vary widely.

SUMMARY OF INVENTION

The present invention relates to a relatively simple, inexpensive and continuous method for producing a a stream of vaporous titanium tetrachloride containing an exact amount of vaporous aluminum trichloride, and is characterized by dissolving the aluminum trichloride in a suitable anhydrous organic or inorganic liquid, exclusive of titanium tetrachloride, adding simultaneously the resulting solution and the liquid titanium tetrachloride to an evaporator in carefully controlled amounts and evaporating both constituents simultaneously. Suitable liquid solvents are those in which the aluminum trichloride will dissolve readily to form an aluminum chloride solution which can be evaporated without residue. Such liquid solvents include, for example, ether, alcohols and thionylchloride.

As will be seen from the description and examples which follow the advantage of the process of this invention lies in the discovery that by dissolving the aluminum trichloride in the aforesaid liquid solvents aluminum trichloride solutions of predetermined concentration can be formed which may then be added to an evaporator simultaneously with an exact amount of liquid titanium tetrachloride and vaporized to form a vapor admixture wherein the aluminum trichloride and titanium tetrachloride are in the exact ratio required for producing vapor phase $TiO_2$ having a precalculated amount of $Al_2O_3$ for optimum rutilization. This exactness of the ratio of aluminum trichloride to titanium tetrachloride in the vapor mixture is only possible by using liquid solutions according to the invention and cannot be achieved by the solid, liquid or gaseous substances of the prior art. Moreover it is now possible to produce vapor mixtures wherein the ratio of these constituents will remain substantially constant over prolonged periods of operation, or may be readily modified if desired.

DESCRIPTION OF THE DRAWING

The attached drawing is a schematic showing of the vaporized and its connection with the burner of a vapor phase unit for producing pyrogenic $TiO_2$.

PREFERRED EMBODIMENT OF THE INVENTION

In accordance with the preferred method of this invention, having reference to the apparatus shown in the drawing, an aluminum trichloride solution of the desired concentration is prepared by adding a predetermined amount of aluminum trichloride, portionwise, to a definite amount of liquid solvent i.e. ether, alcohols or thionylchloride, while stirring. In doing so the solution may heat up somewhat in which case it will be necessary to provide slight exterior cooling. A turbidity may be observed also in the solution due to the presence of small amounts of aluminum oxychloride and since the oxychloride cannot be evaporated it is expedient to filter the solution prior to addition to the liquid titanium tetrachloride; or else let the solution stand until the oxychloride precipitate settles whereupon the supernatant solution may be separated from the precipitate by decantation. The clear supernatant solution having a definite predetermined concentration of aluminum trichloride is then added at a predetermined rate via flow meter 10 and feed pipe 11 to an evaporator 13 via a funnel 12. Liquid titanium tetrachloride is simultaneously added to the evaporator 13 via flow meter 14, feed pipe 15 and funnel 12. The evaporator 13 is heated electrically, or by other suitable means indicated generally at 16, to a temperature sufficiently high that both the aluminum trichloride solution and the liquid $TiCl_4$ are evaporated simultaneously. The vapor mixture leaving the evaporator has a temperature of from 250–350° C. and comprises vaporous aluminum trichloride and vaporous titanium tetrachloride in a ratio corresponding exactly to that of the liquid $TiCl_4$ and aluminum trichloride solution prior to vaporization; and also the solvent and/or decomposition products thereof in vapor form. It has been found however that the presence of the evaporated solvent and/or its decomposition products in the vapors issuing from the evaporator do not interfere adversely with the use of the admixture of vaporous aluminum trichloride and titanium tetrachloride in a reaction with oxygen to produce $TiO_2$, and hence these vapors are admirably suited to the production of pigmentary $TiO_2$ by the vapor phase process. In this connection it will be seen in the drawing that the admixture of vaporous aluminum trichloride and titanium tetrachloride is fed directly from the evaporator into a burner 17 of a vapor phase unit for producing pyrogenic $TiO_2$ the burner 17 being in this instance, a concentric tube burner designed to provide an auxiliary flame for heating the reactants.

With reference to the solution of aluminum trichloride it is preferred to prepare a solution as concentrated as possible for it has been found that under these circumstances a minimum amount of foreign substaces and/or decomposition products of the solvent will be present in the solution. Of the solvents used to prepare the aluminum trichloride solution thionylchloride ($SOCl_2$) is especially suitable. The solubility of the aluminum trichloride in this compound is above 50% even at temperatures as low as room temperature. Furthermore a concentrated solution of aluminum trichloride and thionylchloride has a viscosity sufficiently low that it will flow readily through a conventional flow meter for metering the amount of solution being fed to the evaporator.

Moreover the decomposition products of the thionylchloride are sulphur dioxide, chlorine and disulphur chloride none of which have an obvious or adverse effect in the reaction of the vaporous aluminum trichloride and titanium tetrachloride with oxygen, or on the properties of the $TiO_2$ produced thereby.

The following examples will serve to further illustrate the process of the present invention.

Example I 10 kg. thionylchloride were placed in a closed 10 liter flask fitted with a reflex cooler. 10 kg. of an anhydrous, iron-free aluminum trichloride were added to the flask in increments of from 0.5 to 1 kg. while stirring. During addition of the aluminum trichloride the solution heated up somewhat so that exterior cooling was resorted to. Stirring was continued until all of the aluminum trichloride was dissolved in the solvent. The solution, which was brown in color and slightly cloudy due to the presence of a small amount of aluminum oxychloride residue, containing 50% by weight of aluminum trichloride. This solution was allowed to stand for some time for clarification after which it was separated from the oxychloride precipitate by decantation.

The supernatant solution was then added at the rate of 4 kg./hr. to an electrically heated evaporator. Simultaneously liquid titanium tetrachloride was added at the rate of 100 kg./hr. to the evaporator, where the liquid constituents were simultaneously evaporated to produce a mixture of vaporous aluminum trichloride and titanium tetrachloride. This vapor mixture was, in turn, conducted to a multitube burner where it was reacted with oxygen, in the presence of an auxiliary flame for maintaining combustion, to produce pigmentary $TiO_2$. The pigment analyzed 99% rutile and had excellent optical properties. The $Al_2O_3$ content of the rutile $TiO_2$ was 1.7%, the value calculated on the basis of the amount of aluminum trichloride added being 1.78%.

Example II

An aluminum trichloride solution was prepared in the manner described in Example I except that the concentration of the solution was only 25% by weight aluminum trichloride. This solution was added to the evaporator at the rate of 8 kg./hr. while liquid titanium tetrachloride was added simultaneously at the rate of 100 kg./hr. to produce a vaporous admixture of aluminum trichloride-titanium tetrachloride which was reacted with oxygen as described in Example I. The pigmentary $TiO_2$ so produced had optical properties equal to those of the pigmentary $TiO_2$ prepared by Example I and analyzed as comprising 99% rutile and 1.8% $Al_2O_3$.

Additional runs were made following the procedures described in Example I and II wherein aluminum trichloride solutions of various concentrations were added at various rates to the evaporator to which liquid titanium tetrachloride was being simultaneously added at a constant rate of 100 kg./hr. The results of these runs are shown in the table below which records both the theoretical values and the analytically determined values of $Al_2O_3$ in the rutile $TiO_2$ pigment produced from these various admixtures of vaporous aluminum trichloride and titanium tetrachloride. As will be seen from the data recorded in the table the $Al_2O_3$ values determined by analysis agree very well, within the analysis precision, with the theoretical values calculated on the basis of the amounts added, from which it may be concluded that the actual compositions of the vaporous aluminum trichloride-titanium tetrachloride mixture corresponds to the calculated ratio of aluminum trichloride to titanium tetrachloride.

Similar runs carried out using titanium tetrachloride as a solvent for the aluminum trichloride produced pyrogenic $TiO_2$ pigment wherein the analytically determined amount of $Al_2O_3$ in the pigment varied widely from the theoretical value; nor was there any consistency in concentrations of aluminum trichloride in the solvent solution at selected temperature. These runs showed conclusively that titanium tetrachloride is not suitable as a solvent for producing admixtures of vaporous aluminum trichloride and titanium tetrachloride in exact predetermined ratios.

TABLE

| $AlCl_3$ in $SOCl_2$ solution, percent | Rate of addition of the $SOCl_2$ solution to the evaporator, kg./hr. | $Al_2O_3$ in pyrogenic $TiO_2$ | |
|---|---|---|---|
| | | Theoretical value, percent | Analytically determined value, percent |
| 25 | 5.0 | 1.12 | 1.1 |
| 50 | 4.0 | 1.78 | 1.7 |
| 25 | 8.0 | 1.78 | 1.8 |
| 40 | 6.5 | 2.30 | 2.2 |
| 50 | 6.0 | 2.65 | 2.6 |
| 50 | 8.0 | 3.50 | 3.4 |

Liquid $TiCl_4$ being fed simultaneously to the evaporator at rate of 100 kg./hr.

We claim:
1. Process for producing an admixture of vaporous titanium tetrachloride and aluminum trichloride in an exact predetermined ratio comprising the steps of: adding aluminum trichloride to thionylchloride to dissolve said aluminum trichloride and form an anhydrous aluminum trichloride solution having a predetermined aluminum trichloride concentration, feeding said anhydrous aluminum trichloride solution and liquid titanium tetrachloride simultaneously to an evaporator at rates to maintain an exact predetermined ratio of aluminum trichloride to titanium tetrachloride and simultaneously evaporating said anhydrous aluminum trichloride solution and said liquid titanium tetrachloride to produce an admixture of vaporous aluminum trichloride and titanium tetrachloride in said exact predetermined ratio.

2. Process for producing an admixture of vaporous titanium tetrachloride and aluminum trichloride according to claim 1 wherein said anhydrous aluminum trichloride solution is clarified prior to feeding said solution to said evaporator.

3. Process for producing an admixture of vaporous titanium tetrachloride and aluminum trichloride according to claim 2 wherein said clarified anhydrous aluminum trichloride solution and said liquid titanium tetrachloride are blended by being fed into a blend tank prior to being fed to said evaporator.

4. Process for producing an admixture of vaporous titanium tetrachloride and aluminum trichloride according to claim 2 wherein the liquid titanium tetrachloride is fed to the evaporator at a substantially constant rate and the said clarified anhydrous aluminum trichloride solution is fed to said evaporator simultaneously but at varying rates depending upon the concentration of aluminum trichloride in said solution.

5. Process for producing an admixture of vaporous titanium tetrachloride and aluminum trichloride according to claim 4 wherein the concentration of said anhydrous aluminum trichloride solution is from 25 to 50% by weight aluminum trichloride.

6. Process for producing an admixture of vaporous titanium tetrachloride and aluminum trichloride according to claim 4 wherein the liquid titanium tetrachloride is fed to the evaporator at a substantially constant rate of 100 kg./hr. and said clarified anhydrous aluminum trichloride solution is simultaneously fed to said evaporator at rates varying from 5 to 8 kg./hr. for concentrations ranging from 25 to 50% by weight aluminum trichloride.

References Cited
UNITED STATES PATENTS

| | | | |
|---|---|---|---|
| 2,790,704 | 4/1957 | Lewis | 23—202 |
| 2,824,050 | 2/1958 | Marcot et al. | 106—299 |
| 2,998,321 | 8/1961 | Evans et al. | 106—299 |
| 3,245,818 | 4/1966 | Evans et al. | 23—202 |
| 3,340,008 | 9/1967 | Nelson et al. | 23—202 |

MAYER WEINBLATT, Primary Examiner

I. GLUCK, Assistant Examiner

U.S. Cl. X.R.

23—93, 202; 106—299